United States Patent [19]
Delavaux

[11] Patent Number: 5,548,438
[45] Date of Patent: Aug. 20, 1996

[54] BIDIRECTIONAL OPTICAL AMPLIFIER

[75] Inventor: Jean-Marc P. Delavaux, Wescosville, Pa.

[73] Assignee: AT&T Corp., Murray Hill, N.J.

[21] Appl. No.: 173,837

[22] Filed: Dec. 23, 1993

[51] Int. Cl.⁶ .............................. H04B 10/24; H01S 3/30; G02B 6/26
[52] U.S. Cl. ............................................ 359/341; 385/122
[58] Field of Search ..................................... 359/160, 333, 359/341; 185/122

[56] References Cited

U.S. PATENT DOCUMENTS

| | | | |
|---|---|---|---|
| 4,530,097 | 7/1985 | Stobes et al. | 372/6 |
| 4,554,510 | 11/1985 | Shaw et al. | 359/341 |
| 4,887,309 | 12/1989 | Andersson et al. | 359/160 |
| 5,140,655 | 8/1991 | Bergmann | 385/46 |
| 5,200,964 | 4/1993 | Huber | 372/26 |
| 5,239,607 | 8/1993 | da Silva et al. | 385/112 |
| 5,283,686 | 2/1994 | Huber | 359/341 |
| 5,319,483 | 6/1994 | Krasinski et al. | 385/11 |
| 5,406,413 | 4/1995 | Delavaux et al. | 385/15 |

FOREIGN PATENT DOCUMENTS

| | | |
|---|---|---|
| 3194518 | 8/1991 | China . |
| 1056773 | 12/1991 | China . |
| 0535590 | 4/1993 | European Pat. Off. . |
| 4062527 | 2/1992 | Japan . |
| 4264430 | 9/1992 | Japan . |

OTHER PUBLICATIONS

Delavaux et al, Elect. Lett., vol. 29, #14, pp. 1248–1249, Jul. 8, 1993: abst. only provided herewith.
Journal of Lightware Technology, Jan. 1992, USA, vol. 10, No. 1, pp. 78–83, ISSN 0733-8724, "Optical time domain reflectometry in optical transmission lines containing in–line Erdoped fiber amplifiers", Y. Sato and K–i Aoyama.
IEEE Photonics Technology Letters, vol. 4, No. 8 Aug. 1992, New York US pps. 911–913, XP293633 C. W. Barnard et al. "Bidirectional Fiber Amplifier".
Electronics Letters, vol. 28, No. 6, 12 Mar. 1992, Enage GB pp. 559–561, XP000287238 Y. H. Cheng, et al., "Novel Fibre Amplifier Configuration Suitable for Bidirectional System".
Journal of Lightware Technology, vol. 6, No. 6, Jun. 1988, pp. 937–945, "Simultaneous Single–Fiber Transmission of Video and Bidirectional Voice/Data Using LiNbO3 Guided––Wave Devices", Murphy et al.
IEEE Phtonics Technology Letters, vol. 4, No. 8, Aug. 1992, pp. 911–913, "Bidirectional Fiber Amplifiers"Barnhard, C. W.
Optical Fiber Communication, 1992, pp. 69, "Novel Configuration of an Erbum–doped Fiber Amplifier Using an Optical Circulator", H. Cheng, et al.
IEEE Transactions Photonics Technology Letters, vol. 3, No. 11, Nov., 1991, pp. 1001–1003, "OTDR in Optical Transmission Systems Using Er–Droped Fiber Amplifiers Containing Optical Circulators", Sato, et al.
IEEE Photonics Technology Letters, vol. 4, No. 4, Apr. 1993, pp. 425–427, "Design of Bidirectional Communication Systems with Optical Amplifiers", J. Farre, et al.
IEEE Photonics Technology Letters, vol. 5, No. 2, Feb. 1993, "High–Speed Bidirectional Four–Channel Optical FDM–NCFSK Transmission sUsing an Er3+=Doped Fiber Amplifier", Guo et al.

*Primary Examiner*—Nelson Moskowitz
*Attorney, Agent, or Firm*—Richard D. Laumann

[57] ABSTRACT

A bidirectional optical amplifier uses a four port optical circulator. Optical amplification is obtained in two fiber amplifiers which are connected to the optical circulator.

7 Claims, 2 Drawing Sheets

5,548,438

BIDIRECTIONAL OPTICAL AMPLIFIER

TECHNICAL FIELD

This invention relates generally to the field of optical amplifiers and particularly to such amplifiers that can transmit or amplify signals in both directions.

BACKGROUND OF THE INVENTION

Optical communications using optical fibers is presently a rapidly developing field due to its high data transmission rate at relatively low cost. Early optical transmission systems could not span long distances before the losses in the fibers reached a level that required that the signals be detected and regenerated in a repeater. Simpler systems began to evolve when optical amplifiers were developed; the optical amplifiers are simpler than were the repeaters. The optical amplifier of choice is presently a rare earth doped optical fiber. A commonly used rare earth dopant is erbium and the erbium doped fiber amplifier is often referred to by the acronym EDFA. Optical amplifiers are replacing repeaters in long distance transmission systems. Optical amplifiers are also useful with star couplers because they can be used to replace lost signal power.

Capacity is frequently a critical parameter for system viability, and bidirectional systems are desirable when the increased capacity or other attributes afforded by the bidirectional fiber is required. An exemplary bidirectional system is described by Murphy et al(Murphy) in Journal of Lightwave Technology, 6, pp. 937–945, June 1988. Murphy used $LiNbO_3$ devices as external modulators for lasers. The signals were combined and transmitted on a single fiber. A star coupler useful with fiber amplifiers is described in U.S. Pat. No. 5,140,655 issued on Aug. 22, 1992 to Ernest Bergmann. However, the couplers specifically disclosed do not optically isolate the laser and for many purposes, the laser used as a light source should be isolated from reflections. Bidirectional fiber amplifiers are discussed by Barnard et al(Barnard) in IEEE Photonics Technology Letters, 4, pp. 911–914, August 1992. Of particular interest is the configuration depicted in Barnard's FIG. 2. This is a bidirectional fiber amplifier which uses two four port optical circulators for signal separation. Barnard's technique separates the counter propagating signals, amplifies the signals, and then recombines the signals. See, also, Cheng, page 69, Optical Fiber Communication, 1992, for a description of a bidirectional system. FIG. 3(b) shows the bidirectional system. Two tour port optical circulators are also used in this configuration. See, also, Sato et al., IEEE Transactions Photonics Technology Letters, 3, pp. 1001–1003, November 1991; Farre, et al, IEEE Photonics Technology Letters, 4, pp. 425–427, April 1993; and Guo et al, IEEE Photonics Technology Letters 5, pp. 232–235, February 1993, for descriptions of other bidirectional systems.

SUMMARY OF THE INVENTION

According to an exemplary embodiment of this invention, an optical amplifier has an optical circulator with first, second, third, and fourth ports; at least a first fiber amplifier optically connected to the second and third ports; and means for pumping the said at least first fiber amplifier. In an exemplary embodiment, there is a second fiber amplifier optically connected to the second and third ports. In a preferred embodiment, the means for pumping has a multiplexer having first, second, third, and fourth ports, and first and second light sources connected to the third and fourth ports, respectively. The first and said second ports are optically connected to the first and said second fiber amplifiers, respectively. The first and second light sources may be lasers. In yet another preferred embodiment, there is an optical isolator connected to the second port of said multiplexer and to the second fiber amplifier. The means for pumping may be either local or remote with respect to the optical circulator.

DETAILED DESCRIPTION

The invention will be described by reference to several exemplary embodiments. Variations and other embodiments will be apparent to those skilled in the art.

Figure 1:
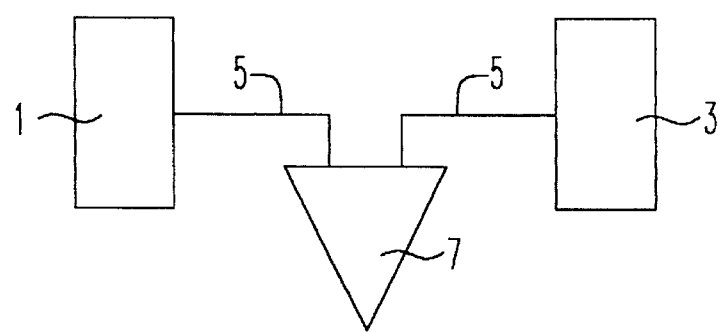
FIGS. 1–2 are schematic representations of optical communications systems according to this invention.
Figure 2:
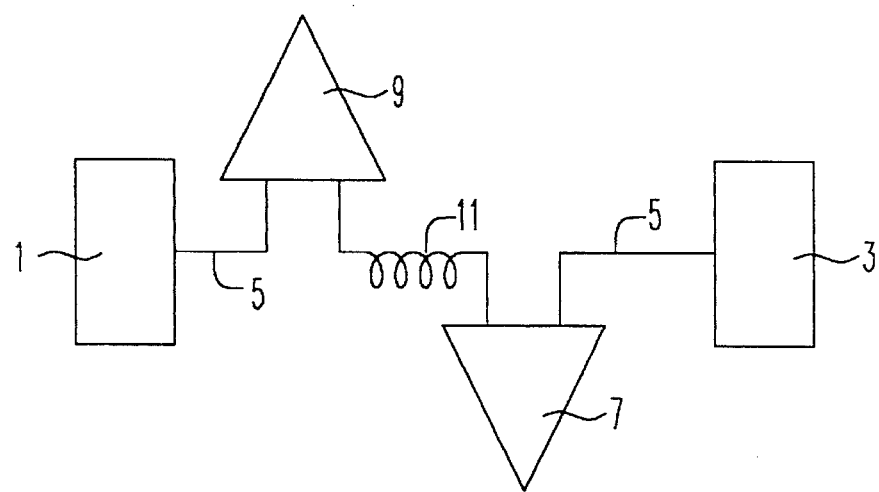

An optical communications system according to this invention using a bidirectional amplifier is schematically depicted in FIG. 1. The system has a transceiver 1 which is optically coupled to transceiver 3 through optical fiber 5. At an intermediate point in the optical fiber path between transceivers, there is an optical amplifier 7. All elements except optical amplifier 7 are conventional and well known and therefore need not be further described to enable the skilled practitioner to understand and implement the invention. Different embodiments of amplifier 7 will be described in detail below. As will be understood from the following discussion, the amplifier amplifies the signal transmitted from transceiver 1 to transceiver 3, but does not necessarily amplify the signal transmitted from transceiver 3 to transceiver 1. Thus, there is a gain G in one direction and no gain in the other direction as shown. Two amplifiers may be cascaded, as shown in FIG. 2, to provide gain in both directions. The second amplifier is shown as amplifier 9 because its characteristics need not be the same as the characteristics of amplifier 7; the gains may differ and the amplifiers may operate at different signal pump wavelengths. There may also be a dispersion compensated fiber 11 in the optical path between the two amplifiers 7 and 9. This fiber may be used to compensate both upstream and downstream signals.

Before the amplifiers are described in detail, several comments about optical circulators are believed appropriate. A three port optical circulator ideally operates with signal inputs and outputs at ports A and B, B and C, and C and A, respectively. A four port optical circulator ideally operates with signal inputs and outputs at ports A and B, B and C, C and D, and D and A, respectively. The adverb ideally is used deliberately. In practice, many three port optical circulators do not function between ports C and A, and many four port optical circulators do not function between ports D and A. That is, these directions are open.

Figure 3:
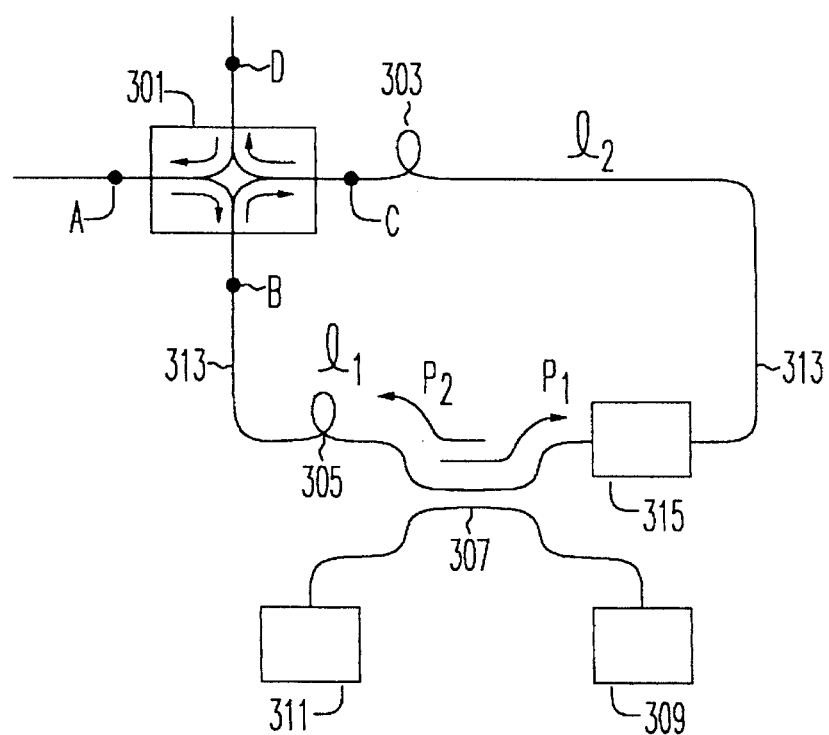
FIGS. 3–5 are schematic representations of optical amplifiers according to this invention.

An optical amplifier of this invention is shown in detail in FIG. 3. Depicted are four port circulator 301, fiber amplifiers 303 and 305, multiplexer 307, and devices 309 and 311 which are depicted as lasers. The circulator has four ports which as shown as A, B, C and D. The directions of light propagation within the circulator are indicated by the arrows. The fiber amplifiers, multiplexer, and circulator are optically coupled to each other by an optical waveguide indicated as waveguide 313.

The fiber amplifiers 303 and 305 are, for example, rare earth doped fiber amplifiers. Erbium is a typical dopant. The fiber amplifiers have lengths $l_1$ and $l_2$ which, in general, will not be the same. Both fiber amplifiers are optically coupled to the second and third ports of the circulator. The amplifiers are connected in series. The pump lasers 309 and 311 are conventional lasers and emit at, for example, 1480 nm, 980 nm, 800 nm, etc. The wavelengths selected will depend upon particular system design. Appropriate wavelengths will be readily selected. The multiplexer has first, second, third, and fourth ports. The first and second ports are connected to the first and second fiber amplifiers 303 and 305. The third and fourth ports are connected to the first and second light sources which are pump lasers 309 and 311. There is also an optical isolator 315 connected between amplifier 303 and the second port of the multiplexer. One of the fiber amplifiers may be omitted.

The operation of the amplifier will be easily understood. Operation will first be described with the isolator missing. The upstream signal enters the circulator at port A and exits from port D after being amplified by both amplifiers 303 and 305. Pump 309 sequentially pumps amplifiers 305 and 303 through circulator ports B and C. Pump 311 pumps amplifier 303. The circulator isolates forward ASE from amplifier 303 which would deplete the inversion of amplifier 305. Since amplifier 303 is operated in the saturation regime, little or no backward ASE travels into amplifier 305 through the multiplexer 307. Amplifier 305 acts as a preamplifier section with a low noise figure and some gain while amplifier 303 acts as a power booster with high output power. This leads to a high signal to noise ratio. The downstream signal travels from port D to port A.

It will be appreciated that pump lasers 309 and 311 represent two light sources; a single laser can be used. In this embodiment, the light from the laser passes through, for example, a 3 dB splitter to create two light beams. Additionally, device 311 can be a Faraday rotator and pump mirror. In this embodiment, left over pump light is reflected by the Faraday rotator or grating back to amplifier 303.

Operation with the isolator present will also be easily understood. The optical isolator is placed in the signal path to isolate the two amplifier stages and the pump 311. The isolator 315 provides low noise and high gain for the amplifier by limiting the backward ASE. Pump 311 pumps amplifiers 305 and 303 through ports B and C while pump 309 pumps amplifier 303 and exits through port D. Amplifier 303 is typically pumped harder than is amplifier 305 to provide more power and a higher signal to noise ratio.

Figure 4:
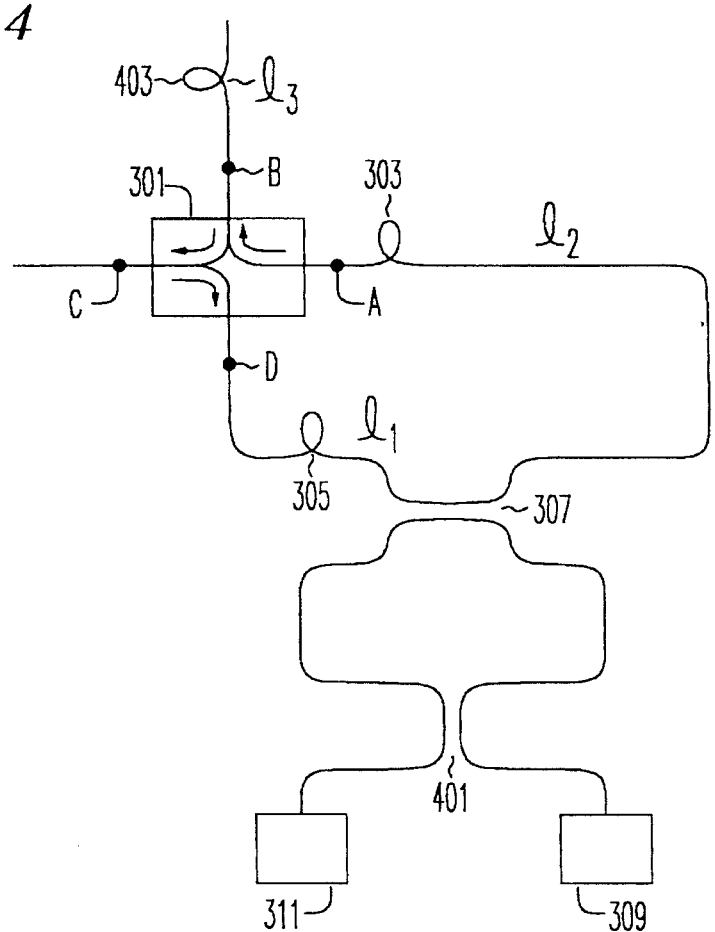

The embodiment described with respect to FIG. 3 used an ideal four port circulator. Four port circulators that are open between ports A and D may also be used. One such embodiment is depicted in FIG. 4. In addition to the elements previously depicted, there is a fiber amplifier 403 having a length $l_3$ connected to port B and a multiplexer 401 connected to devices 309 and 311. The multiplexer 401 connected between lasers 309 and 311 is typically a 3 dB coupler. An attractive feature of this embodiment is that when the pump wavelength is transmitted through the circulator 301, pump power left after pumping amplifier 303 is used to pump amplifier 403. It should be noted that amplifier 403 pumps the downstream signal as well as the upstream signal.

Figure 5:
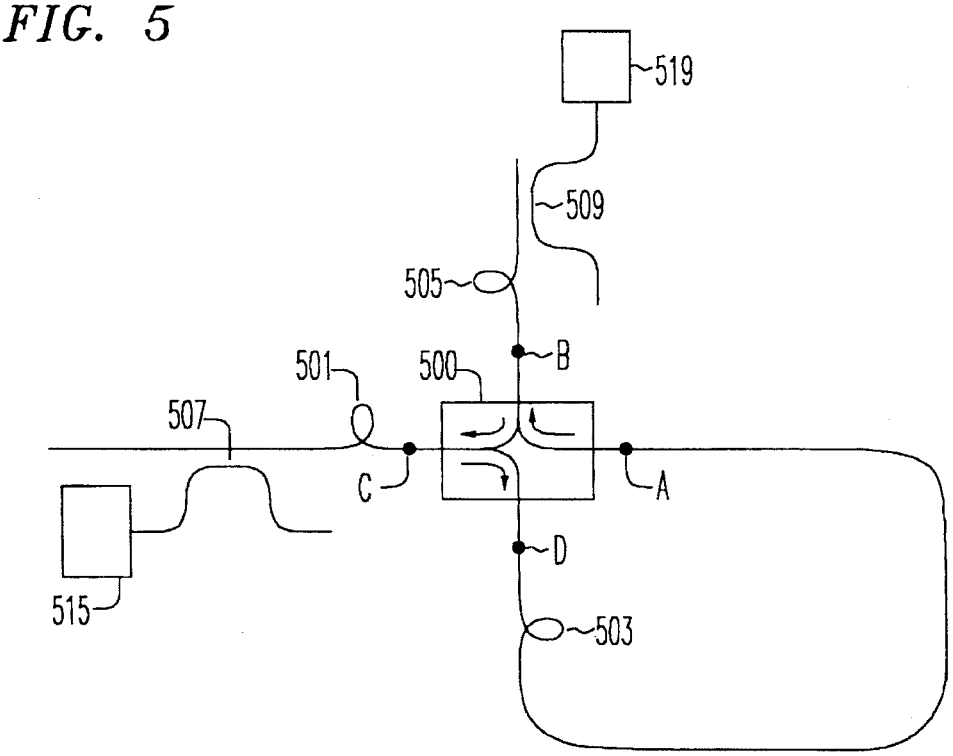

The pumps may be remotely located; that is, they need not be in close proximity to the circulator. Such an embodiment is depicted in FIG. 5. There is a circulator 500 having ports A, B, C, and D. The connection from D to A is open. There are fiber amplifiers 501, 503, and 505 which are connected to ports C, D and B, respectively. There are pumps 515 and 519 which are connected to the fibers by multiplexers 507 and 509, respectively. Pump 515 pumps the three amplifiers 501, 503 and 505. Pump 519 pumps amplifiers 505 and 501. Pump 519 may be omitted if desired. The pumps and multiplexers are shown as remote. However, the multiplexers may be local if desired.

Variations in the embodiments described will be readily thought of by those skilled in the art. It will be appreciated that the amplifiers may be placed at the same or different locations along the transmission path to optimize the transmission span in each direction. It will also be appreciated that amplifiers 7 and 9 are in-line amplifiers and fiber 11 may be used to adjust gain and minimize non-linearities in the fiber. The gain may either follow or precede the fiber. When two amplifiers are used, it will be understood that the first and second optical circulators in the first and second amplifiers are optically connected to each other.

I claim:

1. An optical amplifier comprising:
    a first optical circulator having first, second, third, and fourth ports;
    at least a first fiber amplifier optically connected to said second and third ports, respectively;
    means for pumping said at least first fiber amplifier; and
    a second fiber amplifier optically connected to said second and third ports.

2. An optical amplifier as recited in claim 1 in which said means for pumping comprises a multiplexer having first, second, third, and fourth ports, said first and said second ports being optically connected to said first and said second fiber amplifiers, respectively; and first and second light sources connected to said third and fourth ports, respectively.

3. An optical amplifier as recited in claim 2 in which said first and second light sources comprise lasers.

4. An optical amplifier as recited in claim 2 further comprising an optical isolator connected to said second port of said multiplexer and to said second fiber amplifier.

5. An optical amplifier comprising:
    a first optical circulator having first, second, third, and fourth ports;
    at least a first fiber amplifier optically connected to said second and third ports, respectively; and
    means for pumping said at least first fiber amplifier;
    said means for pumping is local to said first optical circulator.

6. An optical amplifier comprising:
    a first optical circulator having first, second, third and fourth ports;
    at least a first fiber amplifier optically connected to said second and third ports, respectively;
    means for pumping said at least first fiber amplifier; and
    a second optical circulator having first, second, third, fourth ports, said second circulator being optically connected to said first optical circulator;
    third at least a third fiber amplifier connected to said second and third ports, respectively; and
    means for pumping said at least third fiber amplifier.

7. An optical amplifier as recited in claim 6 further comprising a dispersion compensated fiber optically connected to said first and said second optical circulators.

* * * * *